US011395321B2

(12) United States Patent
Tesanovic et al.

(10) Patent No.: US 11,395,321 B2
(45) Date of Patent: Jul. 19, 2022

(54) METHOD AND APPARATUS FOR SCHEDULING REQUEST IN WIRELESS COMMUNICATION SYSTEM

(71) Applicant: Samsung Electronics Co., Ltd., Suwon-si (KR)

(72) Inventors: Milos Tesanovic, Staines (GB); Pravjyot Singh Deogun, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/496,909

(22) PCT Filed: Mar. 23, 2018

(86) PCT No.: PCT/KR2018/003479
§ 371 (c)(1),
(2) Date: Sep. 23, 2019

(87) PCT Pub. No.: WO2018/174662
PCT Pub. Date: Sep. 27, 2018

(65) Prior Publication Data
US 2020/0107350 A1 Apr. 2, 2020

(30) Foreign Application Priority Data

Mar. 23, 2017 (IN) .............................. 201711010237
Mar. 20, 2018 (GB) ..................................... 1804428

(51) Int. Cl.
*H04W 72/12* (2009.01)
*H04W 76/27* (2018.01)
(Continued)

(52) U.S. Cl.
CPC ....... *H04W 72/1289* (2013.01); *H04L 5/0053* (2013.01); *H04W 72/042* (2013.01);
(Continued)

(58) Field of Classification Search
None
See application file for complete search history.

(56) References Cited

U.S. PATENT DOCUMENTS

| 10,356,631 | B1 * | 7/2019 | Pawar | .................. H04W 36/06 |
| 2010/0184445 | A1 * | 7/2010 | Tseng | ................ H04W 72/1284 |
| | | | | 455/450 |

(Continued)

FOREIGN PATENT DOCUMENTS

| WO | 2016010227 A1 | 1/2016 |
| WO | 2016032077 A1 | 3/2016 |

OTHER PUBLICATIONS

Supplementary European Search Report in connection with European Application No. 18770486.1 dated Feb. 25, 2020, 11 pages.

(Continued)

*Primary Examiner* — Andrew C Oh (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Disclosed is a method of managing a schedule request process in a telecommunication network, comprising the steps of: a user equipment, UE, being provided, by a base station, BS, with a Scheduling Request, SR, configuration, whereby the UE adopts the configuration and at a later time the SR configuration is changed as a result of a message from the BS to the UE.

12 Claims, 3 Drawing Sheets

(51) Int. Cl.
*H04L 5/00* (2006.01)
*H04W 72/04* (2009.01)
(52) U.S. Cl.
CPC ... *H04W 72/1205* (2013.01); *H04W 72/1284* (2013.01); *H04W 76/27* (2018.02)

(56) References Cited

U.S. PATENT DOCUMENTS

| | | | |
|---|---|---|---|
| 2010/0202420 A1 | 8/2010 | Jersenius et al. | |
| 2010/0279695 A1* | 11/2010 | Amirijoo | H04W 36/0079 455/438 |
| 2011/0134774 A1* | 6/2011 | Pelletier | H04W 72/042 370/242 |
| 2012/0039263 A1 | 2/2012 | Moberg et al. | |
| 2012/0127950 A1* | 5/2012 | Chung | H04L 5/0055 370/329 |
| 2012/0182908 A1* | 7/2012 | Pan | H04W 72/1284 370/280 |
| 2012/0236767 A1* | 9/2012 | Zhu | H04W 52/34 370/280 |
| 2012/0243497 A1* | 9/2012 | Chung | H04L 1/1861 370/329 |
| 2012/0307760 A1* | 12/2012 | Han | H04L 5/0055 370/329 |
| 2013/0034073 A1* | 2/2013 | Aiba | H04L 5/0055 370/329 |
| 2013/0163532 A1* | 6/2013 | Anderson | H04L 5/0094 370/329 |
| 2013/0163533 A1* | 6/2013 | Anderson | H04W 72/04 370/329 |
| 2013/0163534 A1* | 6/2013 | Anderson | H04L 5/0016 370/329 |
| 2013/0163535 A1* | 6/2013 | Anderson | H04L 1/0072 370/329 |
| 2013/0163536 A1* | 6/2013 | Anderson | H04L 5/0037 370/329 |
| 2013/0163537 A1 | 6/2013 | Anderson et al. | |
| 2013/0250828 A1* | 9/2013 | Chou | H04L 5/0098 370/329 |
| 2013/0308507 A1* | 11/2013 | Wanstedt | H04W 52/0216 370/311 |
| 2013/0336299 A1* | 12/2013 | Lee | H04W 72/0413 370/336 |
| 2014/0050188 A1* | 2/2014 | Park | H04L 5/0094 370/329 |
| 2014/0295909 A1* | 10/2014 | Ouchi | H04W 52/242 455/522 |
| 2014/0376424 A1* | 12/2014 | Seo | H04L 5/14 370/280 |
| 2015/0181406 A1* | 6/2015 | Seo | H04W 76/14 370/329 |
| 2015/0358998 A1* | 12/2015 | Golitschek Edler Von Elbwart | H04L 5/14 370/280 |
| 2015/0373737 A1* | 12/2015 | Park | H04L 5/001 370/329 |
| 2016/0119940 A1* | 4/2016 | Wang | H04W 72/12 370/329 |
| 2016/0127100 A1* | 5/2016 | Xu | H04W 74/0833 370/329 |
| 2016/0135236 A1* | 5/2016 | Zhu | H04W 28/0289 370/230 |
| 2016/0278108 A1* | 9/2016 | Tong | H04W 72/12 |
| 2017/0094642 A1* | 3/2017 | Lee | H04W 72/042 |
| 2017/0202009 A1* | 7/2017 | Kim | H04W 72/1284 |
| 2017/0208619 A1* | 7/2017 | Yang | H04W 72/1284 |
| 2017/0264402 A1* | 9/2017 | Papasakellariou | H04W 52/36 |
| 2017/0303306 A1* | 10/2017 | Lee | H04L 5/0087 |
| 2017/0374658 A1* | 12/2017 | Kim | H04W 72/12 |
| 2018/0035453 A1* | 2/2018 | Yamada | H04W 72/0413 |
| 2018/0123847 A1* | 5/2018 | Xu | H04L 5/0044 |
| 2018/0132274 A1* | 5/2018 | Lee | H04W 28/02 |
| 2018/0262945 A1* | 9/2018 | Yi | H04W 72/1284 |
| 2018/0279295 A1* | 9/2018 | Gao | H04W 72/0446 |
| 2019/0029052 A1* | 1/2019 | Yang | H04L 1/1812 |
| 2019/0090258 A1* | 3/2019 | Ryu | H04W 72/0413 |
| 2019/0281619 A1* | 9/2019 | Lee | H04W 72/1268 |
| 2019/0306872 A1* | 10/2019 | Paredes Cabrera | H04W 72/14 |
| 2020/0288436 A1* | 9/2020 | Byun | H04L 5/0091 |
| 2021/0111823 A1* | 4/2021 | Choi | H04B 7/088 |

OTHER PUBLICATIONS

3GPP TS 36.321 V14.2.1 (Mar. 2017), Technical Specification, 3rd Generation Partnership Project; Technical Specification Group Radio Access Network; Evolved Universal Terrestrial Radio Access (E-UTRA); Medium Access Control (MAC) protocol specification (Release 14), Mar. 2017, 106 pages.
Samsung Electronics R&D Institute UK, "Multiple numerology considerations for SR," R2-170619, 3GPP TSG-RAN WG2 #97, Athens, Greece, Feb. 13-17, 2017, 3 pages.
Combined Search and Examination Report under Sections 17 & 18(3) dated Sep. 3, 2018 in connection with United Kingdom Patent Application No. GB1804428.9, 2 pages.
ISR/WO, International Search Report and Written Opinion of the International Searching Authority, International Application No. PCT/KR2018/003479, dated Jun. 26, 2018, 10 pages.
3GPP TS 38.212 V15.5.0 (Mar. 2019), Technical Specification, 3rd Generation Partnership Project; Technical Specification Group Radio Access Network; NR; Multiplexing and channel coding (Release 15), Mar. 2019, 101 pages.
3GPP TS 38.213 V15.5.0 (Mar. 2019), Technical Specification, 3rd Generation Partnership Project; Technical Specification Group Radio Access Network; NR; Physical layer procedures for control (Release 15), Mar. 2019, 104 pages.
3GPP TS 38.321 V15.5.0 (Mar. 2019), Technical Specification, 3rd Generation Partnership Project; Technical Specification Group Radio Access Network; NR; Medium Access Control (MAC) protocol specification (Release 15), Mar. 2019, 78 pages.
Cohere Technologies, PRACH Preamble Format Design, R1-1711527, 3GPP TSG-RAN WG1 NR Ad Hoc Meeting #2, Qingdao, China, Jun. 27-30, 2017, 3 pages.
Ericsson, "Remaining issues for Scheduling Request," Tdoc R2-1711178, 3GPP TSG-RAN WG #99bis, Prague, Czech Republic, Oct. 9-13, 2017, 7 pages.
ETSI MCC, "Report of 3GPP TSG RAN2 #99bis meeting, Prague, Czech Republic," R2-1712101, 3GPP TSG-RAN WG2 meeting #100, Reno, Nevada, USA, Nov. 27-Dec. 1, 2017, 237 pages.
Intel Corporation, "Scheduling request design for NR," R1-1702234, 3GPP TSG RAN WG1 Meeting #88, Athens, Greece, Feb. 13-17, 2017, 5 pages.
MCC Support, "Final Report of 3GPP TSG RAN WG1 #88 v.1.0.0," R1-1704172, 3GPP TSG RAN WG1 Meeting #88bis, Spokane, USA, Apr. 3-7, 2017, 152 pages.
RAN2 Chairman (Intel), 3GPP TSG-RAN WG2 Meeting #97bis, Spokane, USA, Apr. 3-7, 2017, 75 pages.
Samsung, "On NR scheduling request," R1-1702993, 3GPP TSG RAN WG1 Meeting #88, Athens, Greece, Feb. 13-17, 2017, 4 pages.

* cited by examiner

METHOD AND APPARATUS FOR SCHEDULING REQUEST IN WIRELESS COMMUNICATION SYSTEM

CROSS-REFERENCE TO RELATED APPLICATIONS

This application is a 371 National Stage of International Application No. PCT/KR2018/003479, filed Mar. 23, 2018 which claims priority to Indian Patent Application No. 201711010237, filed Mar. 23, 2017, and United Kingdom Patent Application No. 1804428.9, filed Mar. 20, 2018, the disclosures of which are herein incorporated by reference in their entirety.

BACKGROUND

1. Field

The disclosure relates to a wireless communication system, and in particular, relates to method and apparatus for scheduling request (SR) in wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mm Wave) bands, e.g., 60 GHz bands, so as to accomplish higher data rates. To decrease propagation loss of the radio weaves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvements under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There may be a case where a user equipment (UE) should transmit scheduling request (SR) for transmitting some uplink information. For example, when the UE does not have enough data allocated on the uplink shared channel (UL-SCH) to send buffer status reporting (BSR), the UE may transmit the SR. To transmit uplink information properly, improvements in SR performance could be required.

SUMMARY

An aspect of the present disclosure is to provide a method and apparatus for improving scheduling request (SR) performance in a wireless communication system.

According to various embodiments of the disclosure a method of a user equipment (UE) in a wireless communication system comprises receiving, from a base station (BS), a scheduling request (SR) configuration. the SR configuration is changed in response to receiving a message from the BS.

According to various embodiments of the disclosure, a method of a BS in a wireless communication system comprises transmitting, to a UE, a SR configuration. The SR configuration is changed in response to the UE receiving a message from the BS.

According to various embodiments of the disclosure, a UE in a wireless communication system comprises a transceiver configured to receive, from a BS, an SR configuration. The SR configuration is changed in response to receiving a message from the BS.

According to various embodiments of the disclosure, a BS in a wireless communication system comprises a transceiver configured to transmit, to a UE, an SR configuration. The SR configuration is changed in response to the UE receiving a message from the BS.

Although a few preferred embodiments of the present invention have been shown and described, it will be appreciated by those skilled in the art that various changes and modifications might be made without departing from the scope of the invention, as defined in the appended claims.

According to various embodiments of the present disclosure, a scheduling request (SR) performance can be improved.

DETAILED DESCRIPTION

The disclosure relates particularly, but not exclusively to Fifth Generation (5G) systems—termed New Radio (NR) systems in 3GPP, but may also be applicable to other standards and systems, such as 4G (LTE and its evolution).

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for scheduling request in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
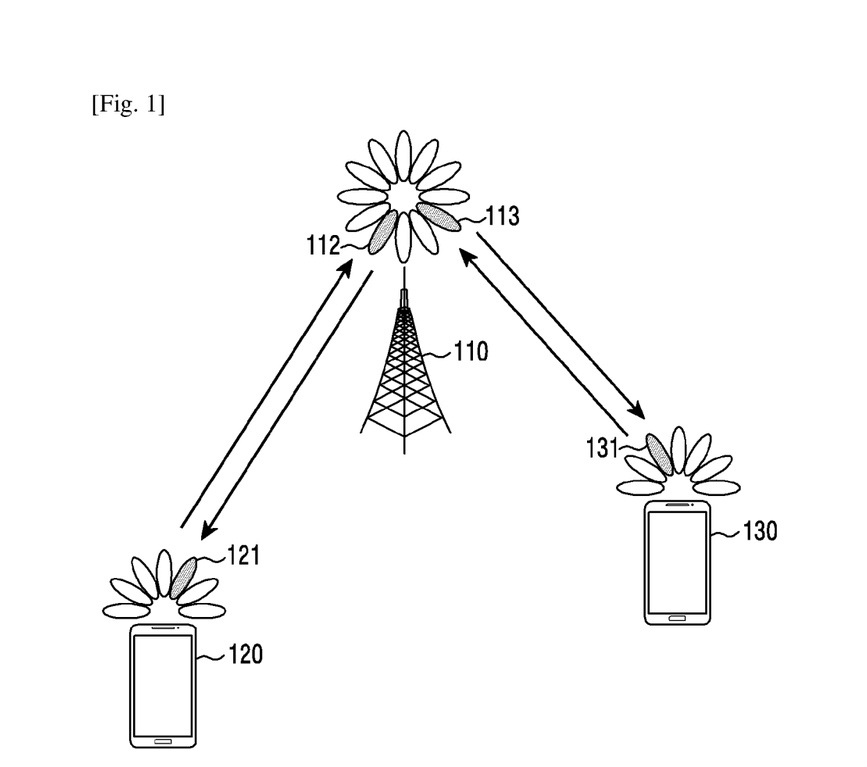
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
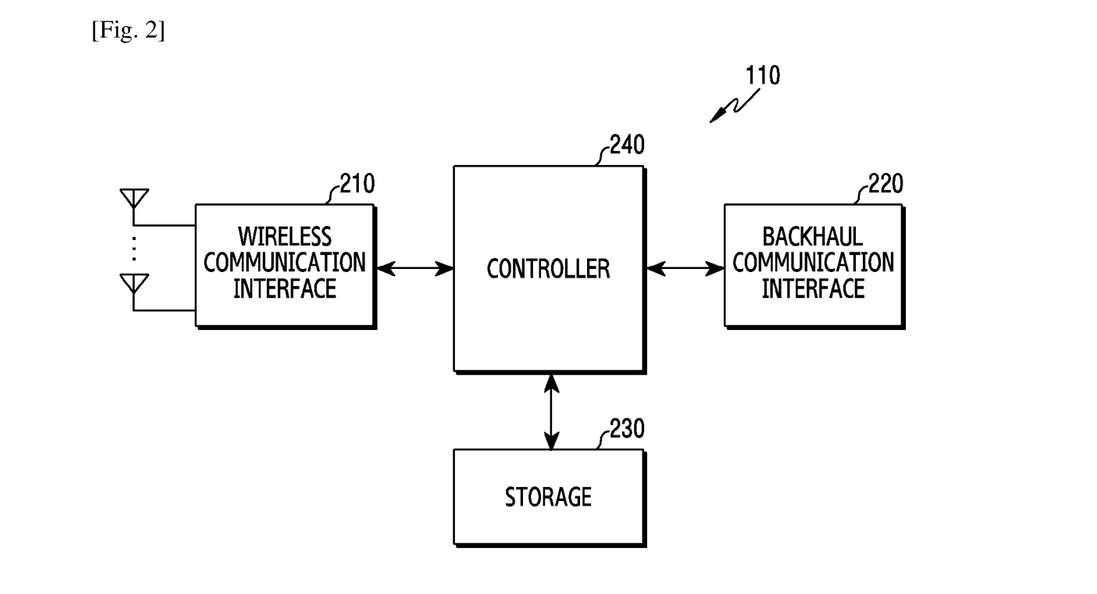
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may control to transmit, to a UE, a scheduling request (SR) configuration The SR configuration is changed in response to the UE receiving a message from the BS. For example, the controller 240 may control the base station to perform operations according to the exemplary embodiments of the present disclosure.

According to exemplary embodiments of the present disclosure, the UE is provided with a plurality of SR configurations including the SR configuration by the BS, and at least one of the plurality of SR configuration comprises an activated SR configuration.

According to exemplary embodiments of the present disclosure, the wireless communication interface 210 is further configured to transmit, to the UE, a reconfiguration message in responsive to a change in at least one of factors. The factors comprises a UE type; downlink (DL) traffic queued in buffers at the BS; information related to previous UE connections to a network; previous data transmitted on an uplink from the UE; current signalling load in a particular cell, or cluster of cells, served by the BS; and estimates of signalling load in the particular cell, or the cluster of cells, served by the BS.

According to exemplary embodiments of the present disclosure, the wireless communication interface 210 is further configured to receive, from the UE in responsive to a change in at least one of components in a group of information, information related to the change, and transmit, to the UE, a reconfiguration message in responsive to receiving the information related to the change. The components comprises information related to a type of data in uplink (UL) buffers of the UE; information related to previous data transmissions of the UE; information relating to at least one of active applications or quality of service (QoS) class identifier (QCI) requirements to be expected; and information related to architectural aspects of a connected system known to the UE, and whereby the BS instructs the UE which SR configuration to use in response.

According to exemplary embodiments of the present disclosure, the wireless communication interface 210 is further configured to transmit, to the UE, an initial SR configuration instruction on an radio resource control (RRC) channel.

According to exemplary embodiments of the present disclosure, the wireless communication interface 210 is further configured to transmit, to the UE, a subsequent reconfiguration instruction on a lower layer channel through at least one of a media access control (MAC) control element (MAC CE) signalling, or a downlink control information (DCI) signalling.

Figure 3:
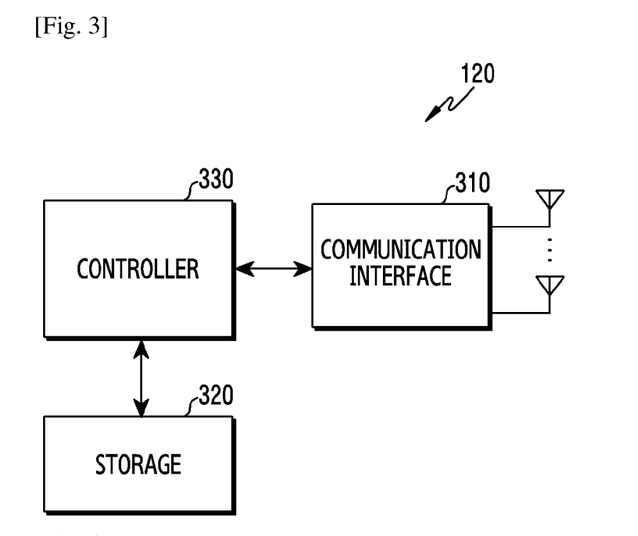
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RE chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control to receive, from a BS, a SR configuration. The SR configuration is changed in response to receiving a message from the BS. For example, the controller 330 may control the terminal to perform operations according to the exemplary embodiments of the present disclosure.

According to exemplary embodiments of the present disclosure, the UE is provided with a plurality of SR configurations including the SR configuration by the BS, and at least one of the plurality of SR configuration comprises an activated SR configuration.

According to exemplary embodiments of the present disclosure, the activated SR configuration is determined based on at least one of actors comprising: a UE type; downlink (DL) traffic queued in buffers at the BS; information related to previous UE connections to a network; previous data transmitted on an uplink from the UE; current signalling load in a particular cell, or cluster of cells, served by the BS; and estimates of signalling load in the particular cell, or the cluster of cells, served by the BS.

According to exemplary embodiments of the present disclosure, a change in at least one of the factors causes the BS to transmit a reconfiguration message to the UE.

According to exemplary embodiments of the present disclosure, the communication interface 310 is further configured to transmit, to the BS, at least one of components in a group of information. The components comprises information related to a type of data in uplink (UL) buffers of the UE; information related to previous data transmissions of the UE; information relating to at least one of active applications or quality of service (QoS) class identifier (QCI) requirements to be expected; and information related to architectural aspects of a connected system known to the UE, and whereby the BS instructs the UE which SR configuration to use in response.

According to exemplary embodiments of the present disclosure, a change in at least one of the components causes the UE to transmit information related to the change to the BS. The communication interface 310 is further configured to receive, from the BS, a reconfiguration message.

Figure 4:
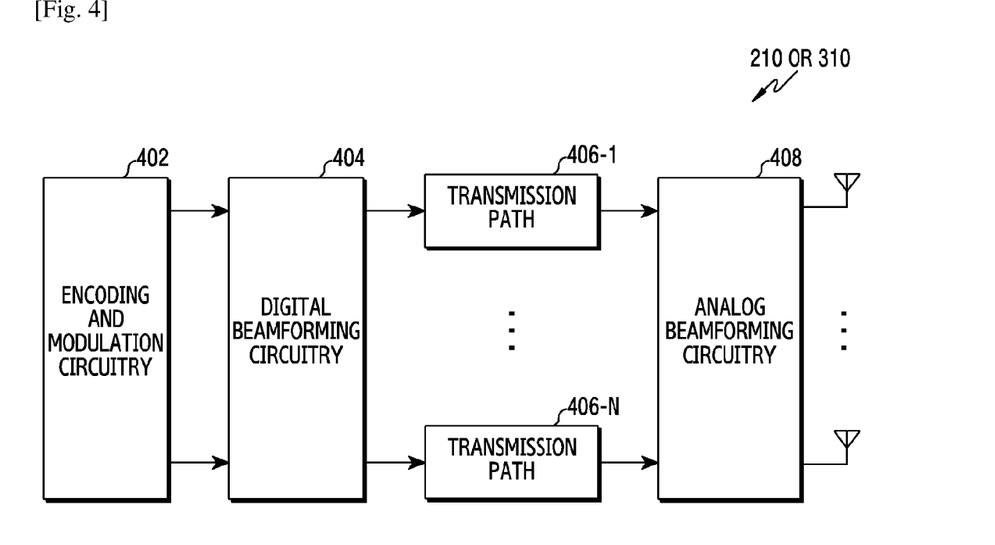
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals, To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

It has been observed with new radio (NR) that there can be a latency problem caused by Scheduling Request (SR) and Buffer Status Reporting (BSR). In normal Long Term Evolution (LTE) operation, SR is sent only when the UE does not have enough data allocated on the uplink (UL) shared channel (SCH) to send a BSR. SR is a simple one-bit indication that more resource is needed, without saying anything about the amount of resource needed and the Quality of Service (QoS) support required for the data in question. It has already been agreed, at a standardisation level, to support shorter periodicities for SR transmission in NR to help address this problem.

However, there is a need for further improvements in SR performance in NR.

In NR, there is the additional complexity that the radio network will need to support very different types of services. For instance, in NR Phase-I, simultaneous support is guaranteed for enhanced Mobile Broadband (eMBB) and Ultra-Reliable and Low-Latency Communications (URLLC), Based on recent standardisation discussions it is likely that URLLC and eMBB will be deployed using different numerologies.

It is desirable to achieve an uplink grant which can be allocated with appropriate size and physical layer numerology based on underlying QoS requirement, and also UL latency improvement should be made possible because of the knowledge of different underlying Transmission Time Interval (TTI) values. The existing SI ASR mechanism can therefore be viewed as sub-optimal for multiple numerology support as it lacks support for these features. It should be noted that for a multiple numerology scenario, a UE may not multiplex data from all logical channels into one single MAC Protocol Data Unit (PDU), resulting in inefficiencies if the existing SR/BSR mechanisms are applied in NR.

Even in the case of single numerology with multiple QoS requirements (e.g. URLLC applications), the existing SR/BSR mechanism can be, in some cases, prohibitive. Some gain could be achieved in the speed (and accuracy) of uplink resource size allocation if the QoS requirements were communicated to the Base Station (gNB) sooner, even when the value of the TTI is fixed.

Some proposed solutions include multi-bit SR, as well as other alternative solutions. However if the SR resources are dedicated per UE and/or only for the highest priority numerology (the case when single SR resource is configured for multiple services/use cases), there is a need for a means of enabling the UE to match the initial SR transmission to the MAC PDU content. It is an aim of embodiments of the disclosure to address this issue.

Embodiments of the disclosure address the case where a single SR resource is configured for multiple services/use cases.

To illustrate this scenario, imagine there is a long pause in Uplink, UL (data) transmissions. The network is not aware of the type of UL data to be transmitted until it gets the BSR. It would be beneficial to ensure that the SR transmission could initially indicate whether there is any change in numerology/QCI from previous transmissions.

In many cases (e.g. dedicated uMTC terminals), there won't be any such indication and this approach then saves on control signaling. Essentially, embodiments of the disclosure allow the network to control SR resource scheduling (e.g. periodicity) dynamically based on the UE's feedback about type (e.g. QCI) of data transmitted in uplink.

Embodiments of the disclosure provide a form of SR configuration update or switching, depending on the type of data that the UE wants to transmit. One embodiment makes this switch operation faster by utilising MAC CE or DCI-based switching by network rather than making RRC signaling responsible for this switch.

Two high-level options are therefore presented:
Option-1: The UE is provided with multiple SR configurations in the first Radio Resource Control (RRC) message and only one of these configurations is activated initially. The network may indicate a change of SR configuration by providing SR configuration index in DCI/MAC Control Elements (CE).
Option-2: The UE is provided with a single SR configuration in RRC. However, if the network decides to change some parameter (e.g. periodicity), it sends the parameter's value using DCI/MAC CE. For example, the network can change any of the following parameters relating to SR transmission dynamically via DCI/MAC CE:
SR periodicity to adjust SR overhead based on service requirements;
PUCCH format (to change amount of information carried by SR); or
SR/PUCCH code (to change the code used for transmission of SR e.g. based on service requirements)

If the UE is only able (based on MAC CE/DCI messages formats) to indicate some change in parameter of the original configuration (e.g. periodicity) then it may only be possible to provide it with a single configuration (Option-2) or, possibly, multiple configurations but with the understanding that the UE can only indicate incremental parameter-value changes. In other words, in the case where signaling is limited. Option-2 may be preferred (or the only one possible). If this case there may be limits to the changes in SR configuration which can be effected using the mechanisms of this disclosure. On the other hand, when multiple configurations are initially provided, limitations in the scope of subsequent changes to the configuration may be less stringent and are concerned with the RRC format of messages used. In an embodiment of this disclosure, these details are taken into account when deciding between Option-1 and Option2, or switching between those two ways of configuring the UE.

Figure 5:
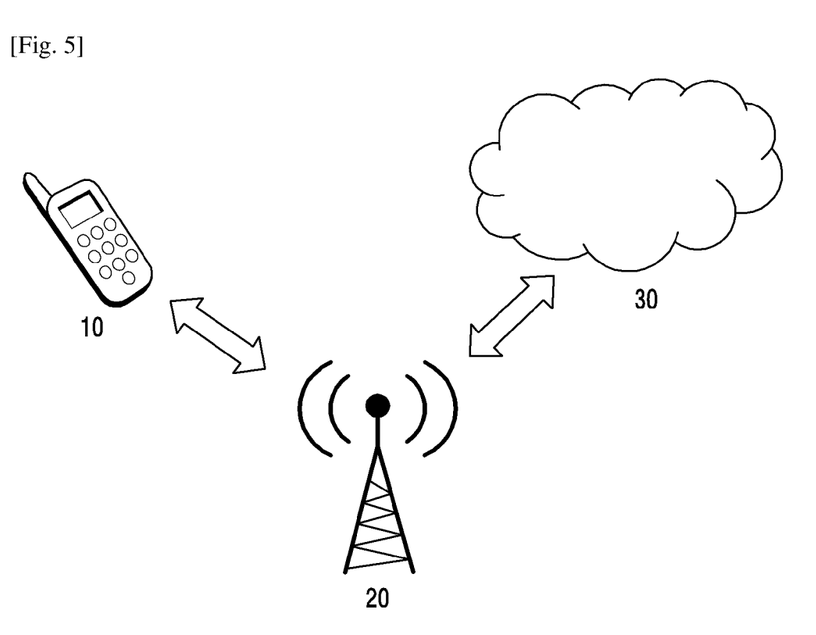
FIG. 5 illustrates a general schematic layout of a network according to an embodiment of the present invention.

In another embodiment, the network configures more than one configuration (such as in the case of multi-numerology scenario) initially. The UE could then indicate (e.g. using uplink control information or MAC CE) which ones could be released based on any of the following:
Knowledge of data type in its buffers;
Past history of its data transmissions; or
Knowledge of active applications in its OS and the likely QCI requirements to be expected.
Knowledge of various architectural aspects of the system visible to the UE—e.g. if a UE is used as a relay for D2D traffic then it may have a good idea of the QoS requirements of such P2P traffic The base station 20 (eNB) may be a base station such as a base station 110. The base station 20 can then confirm that change with MAC or DCI signaling. Additionally, in some cases (e.g. UEs dedicated to a single type of traffic) these options could be 'pre-programmed' into the UE (e.g. linked to a predefined UE category).

The UE 10 may be a terminal such as terminal 120 or terminal 130. The UE 10 may also have different MAC configuration to control SR transmission (e.g. SR prohibit timer) for different SR configurations. In this case when SR configuration is switched by the network, the UE may apply the new MAC configuration for SR control immediately.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a user equipment (UE) in a wireless communication system, the method comprising:
receiving, from a base station, a radio resource control (RRC) message including information on a plurality of scheduling request (SR) configurations, wherein each of the plurality of SR configurations includes information on a physical uplink control channel (PUCCH) format, information on a SR periodicity, and information on a code used for SR transmission;
receiving, from the base station, downlink control information (DCI) for changing a parameter of each of the plurality of SR configurations, wherein the DCI includes a value of the parameter; and
transmitting, to the base station, an SR based on the value and an activated SR configuration among the plurality of SR configurations,
wherein the parameter comprises one of the PUCCH format, the SR periodicity, and the code used for SR transmission.

2. The method of claim 1, wherein each SR configuration of the plurality of SR configurations is associated with a medium access control (MAC) configuration including a SR prohibit timer.

3. The method of claim 2, wherein the DCI is received based on a type of uplink data, the type comprising a quality of service (QoS) class identifier (QCI).

4. The method of claim 3, wherein the activated SR configuration is determined based on at least one of factors comprising:
a UE type;
downlink (DL) traffic queued in buffers at the base station;
information related to previous UE connections to a network;
previous data transmitted on an uplink from the UE;
current signalling load in a particular cell, or cluster of cells, served by the base station; and
estimates of signalling load in the particular cell, or the cluster of cells, served by the base station.

5. The method of claim 3, further comprising:
transmitting, to the base station, a message including at least one of components in a group of information, the components comprising:
information related to a type of data in uplink (UL) buffers of the UE;
information related to previous data transmissions of the UE;
information relating to at least one of active applications or QCI requirements to be expected; and
information related to architectural aspects of a connected system known to the UE, and
wherein the base station instructs the UE which SR configuration to use in response of the message.

6. A method performed by a base station in a wireless communication system, the method comprising:
transmitting, to a user equipment (UE), a radio resource control (RRC) message including information on a plurality of scheduling request (SR) configurations, wherein each of the plurality of SR configurations includes information on a physical uplink control channel (PUCCH) format, information on a SR periodicity, and information on a code used for SR transmission;

transmitting, to the UE, downlink control information (DCI) for changing a parameter of each of the plurality of SR configurations, wherein the DCI includes a value of the parameter; and receiving, from the UE, an SR based on the value and an activated SR configuration among the plurality of SR configurations, wherein the parameter comprises one of the PUCCH format, the SR periodicity, and the code used for SR transmission.

7. The method of claim 6, wherein each SR configuration of the plurality of SR configurations is associated with a medium access control (MAC) configuration including a SR prohibit timer.

8. The method of claim 6, wherein the DCI is received based on a type of uplink data, the type comprising a quality of service (QoS) class identifier (QCI).

9. The method of claim 8, further comprising:

transmitting, to the UE, a reconfiguration message in responsive to a change in at least one of factors, the factors comprising:

a UE type;

downlink (DL) traffic queued in buffers at the base station;

information related to previous UE connections to a network;

previous data transmitted on an uplink from the UE;

current signalling load in a particular cell, or cluster of cells, served by the base station; and estimates of signalling load in the particular cell, or the cluster of cells, served by the base station.

10. The method of claim 8, further comprising:

receiving, from the UE, a message including at least one of components in a group of information, the components comprising:

information related to a type of data in uplink (UL) buffers of the UE;

information related to previous data transmissions of the UE;

information relating to at least one of active applications or QCI requirements to be expected; and information related to architectural aspects of a connected system known to the UE, and wherein the base station instructs the UE which SR configuration to use in response of the message.

11. A user equipment (UE) in a wireless communication system, the UE comprising:

a transceiver; and at least one processor coupled to the transceiver and configured to:

receive, from a base station, a radio resource control (RRC) message including information on a plurality of scheduling request (SR) configurations, wherein each of the plurality of SR configurations includes information on a physical uplink control channel (PUCCH) format, information on a SR periodicity, and information on a code used for SR transmission;

receive, from the base station, downlink control information (DCI) for changing a parameter of each of the plurality of SR configurations, wherein the DCI includes a value of the parameter; and transmit, to the base station, an SR based on the value and an activated SR configuration among the plurality of SR configurations, wherein the parameter comprises one of the PUCCH format, the SR periodicity, and the code used for SR transmission.

12. A base station in a wireless communication system, the base station comprising:

a transceiver; and at least one processor coupled to the transceiver and configured to:

transmit, to a user equipment (UE), a radio resource control (RRC) message including information on a plurality of scheduling request (SR) configurations, wherein each of the plurality of SR configurations includes information on a physical uplink control channel (PUCCH) format, information on a SR periodicity, and information on a code used for SR transmission;

transmit, to the UE, downlink control information (DCI) for changing a parameter of each of the plurality of SR configurations, wherein the DCI includes a value of the parameter; and receive, from the UE, an SR based on the value and an activated SR configuration among the plurality of SR configurations, wherein the parameter comprises one of the PUCCH format, the SR periodicity, and the code used for SR transmission.

* * * * *

UNITED STATES PATENT AND TRADEMARK OFFICE
CERTIFICATE OF CORRECTION

PATENT NO. : 11,395,321 B2
APPLICATION NO. : 16/496909
DATED : July 19, 2022
INVENTOR(S) : Milos Tesanovic et al.

It is certified that error appears in the above-identified patent and that said Letters Patent is hereby corrected as shown below:

On the Title Page

Column 1, Item (30) Line 3, "(GB) 1804428" should read -- (GB) 1804428.9 --.

Signed and Sealed this
Seventh Day of February, 2023

Katherine Kelly Vidal
*Director of the United States Patent and Trademark Office*